US012674035B2

(12) United States Patent
Iwazaki et al.

(10) Patent No.: US 12,674,035 B2
(45) Date of Patent: Jul. 7, 2026

(54) THERMALLY CONDUCTIVE SHEET

(71) Applicant: SEKISUI POLYMATECH CO., LTD.,
Saitama-city (JP)

(72) Inventors: Hiromichi Iwazaki, Kounosu (JP);
Kentaro Kiuchi, Saitama-city (JP);
Kenta Kuroo, Shimamotocho (JP);
Hiroki Kudoh, Kawaguchi (JP)

(73) Assignee: SEKISUI POLYMATECH CO., LTD.,
Saitama (JP)

( * ) Notice: Subject to any disclaimer, the term of this
patent is extended or adjusted under 35
U.S.C. 154(b) by 607 days.

(21) Appl. No.: 18/026,186

(22) PCT Filed: Aug. 24, 2021

(86) PCT No.: PCT/JP2021/031027
§ 371 (c)(1),
(2) Date: Mar. 14, 2023

(87) PCT Pub. No.: WO2022/070680
PCT Pub. Date: Apr. 7, 2022

(65) Prior Publication Data
US 2023/0365766 A1 Nov. 16, 2023

(30) Foreign Application Priority Data

Sep. 30, 2020 (JP) ................................. 2020-166387

(51) Int. Cl.
*C08J 5/18* (2006.01)
*C08K 3/04* (2006.01)
*C08K 7/04* (2006.01)

(52) U.S. Cl.
CPC ................. *C08J 5/18* (2013.01); *C08K 3/042*
(2017.05); *C08K 7/04* (2013.01); *C08J*
*2383/05* (2013.01); *C08K 2201/001* (2013.01)

(58) Field of Classification Search
CPC ........ C08K 2201/014; C08K 2201/004; C08K
3/04
See application file for complete search history.

(56) References Cited

U.S. PATENT DOCUMENTS

2016/0091265 A1* 3/2016 Aramaki ................. F28F 21/02
2017/0309542 A1 10/2017 Aramaki et al.
(Continued)

FOREIGN PATENT DOCUMENTS

JP      2002-97372      4/2002
JP      2010-254766     11/2010
(Continued)

OTHER PUBLICATIONS

International Search Report (ISR) issued Nov. 22, 2021 in Interna-
tional (PCT) Application No. PCT/JP2021/031027.
(Continued)

*Primary Examiner* — Catherine S Branch
*Assistant Examiner* — Huihong Qiao
(74) *Attorney, Agent, or Firm* — Wenderoth, Lind &
Ponack, L.L.P.

(57) ABSTRACT

The present invention is a thermally conductive sheet com-
prising: a matrix comprising an organic polymer, and a
carbon fiber X, the carbon fiber X being oriented in a
thickness direction of the sheet, wherein a proportion of a
carbon fiber (A) having a fiber length of 100 μm or less is
40% or more and a proportion of a carbon fiber (B) having
a fiber length of 200 μm or more is 3 to 13% of the carbon
fiber X. According to the present invention, a thermally
conductive sheet in which the thermal resistance value is
effectively reduced by polishing the surface, resulting in a
sheet having a low thermal resistance value can be provided.

7 Claims, 2 Drawing Sheets

(56) References Cited

U.S. PATENT DOCUMENTS

| | | |
|---|---|---|
| 2018/0292148 A1 | 10/2018 | Watanabe |
| 2019/0023874 A1* | 1/2019 | Jia ............................ C08K 7/06 |
| 2021/0388175 A1 | 12/2021 | Iwazaki |

FOREIGN PATENT DOCUMENTS

| | | |
|---|---|---|
| JP | 2014-27144 | 2/2014 |
| JP | 2016-92407 | 5/2016 |
| JP | 2018-14534 | 1/2018 |
| JP | 2018-56315 | 4/2018 |
| TW | 201621256 | 6/2016 |
| TW | 201936886 | 9/2019 |
| WO | 2018/047828 | 3/2018 |
| WO | 2020/067141 | 4/2020 |

OTHER PUBLICATIONS

Tianyu et al., Effect of Silicon Carbide and Carbon Fiber on Properties of Thermal Conductive MVQ Composition, Changzhou University, Changzhou, China, vol. 63, pp. 231-234, Abstract and machine translation.

Panzer et al., "Thermal Properties of Metal-Coated Vertically-Aligned Single Wall Nanotube Films," IEEE, 2006, pp. 1306-1313.

* cited by examiner

THERMALLY CONDUCTIVE SHEET

TECHNICAL FIELD

The present invention relates to a thermally conductive sheet, and relates to, for example, a thermally conductive sheet to be used by being disposed between a heating element and a heat-dissipating element.

BACKGROUND ART

In electronic devices, such as a computer, an automobile part, and a cellular phone, a heat-dissipating element, such as a heat sink, is generally used for dissipating heat which is generated from a heating element such as a semiconductor element or a mechanical part. It is known that a thermally conductive sheet is disposed between a heating element and a heat-dissipating element for the purpose of enhancing the efficiency of heat transfer to the heat-dissipating element.

A thermally conductive sheet is generally used by being compressed when disposed inside an electronic device, and high flexibility is required in the thermally conductive sheet. Accordingly, a thermally conductive sheet is formed by blending a filler having thermal conductive properties in a polymer matrix having high flexibility, such as rubber or gel. Further, it is widely known that a filler having anisotropy, such as a carbon fiber, is oriented in the thickness direction in a thermally conductive sheet in order to enhance the thermal conductive properties in the thickness direction (see, for example, PTLs 1 and 2).

From the viewpoint of enhancing the thermal conductive properties more, PTL 3 describes an invention relating to a thermally conductive sheet in which a filler having anisotropy, such as carbon fiber, appears from the surface of the sheet and the arithmetic mean peak curvature (Spc) of the surface of the sheet is a certain value or less, and describes in Examples that the thermal resistance value can be reduced (that is, the thermal conductive properties can be enhanced) by polishing the surface of the sheet produced under certain conditions.

CITATION LIST

Patent Literature

PTL1: JP 2018-056315 A
PTL2: JP 2018-014534 A
PTL3: WO 2020/067141 A

SUMMARY OF INVENTION

Technical Problem

In the above-described invention according to PTL3, a thermally conductive sheet having a relatively low thermal resistance value and good heat dissipation properties can be obtained. However, with high functionalization of electronic devices, the calorific value has been increased, and thus a thermally conductive sheet having a lower thermal resistance value than conventional sheets has been required in recent years.

Therefore, an object of the present invention is to provide a thermally conductive sheet having a thermal resistance value lower than the conventional ones.

Solution to Problem

The present inventors have intensively studied and found that, in a thermally conductive sheet comprising: a matrix comprising an organic polymer, and a carbon fiber X, the carbon fiber X being oriented in a thickness direction of the sheet, in which the carbon fiber X comprises a carbon fiber having a long fiber length and a carbon fiber having a short fiber length in a specific ratio, the thermal resistance value is effectively reduced by polishing the surface, resulting in a sheet having a low thermal resistance value, thereby completing the present invention.

That is, the present invention provides the following [1] to [6].

[1] A thermally conductive sheet comprising: a matrix comprising an organic polymer, and a carbon fiber X, the carbon fiber X being oriented in a thickness direction of the sheet, wherein a proportion of a carbon fiber (A) having a fiber length of 100 μm or less is 40% or more of the carbon fiber X and a proportion of a carbon fiber (B) having a fiber length of 200 μm or more is 3 to 13% of the carbon fiber X.

[2] The thermally conductive sheet according to [1], wherein a proportion of a carbon fiber (C) having a fiber length of 50 μm or less is 5% or less of the carbon fiber X.

[3] The thermally conductive sheet according to [1] or [2] further comprising a scale-like carbon powder.

[4] The thermally conductive sheet according to any one of [1] to [3], wherein a part of the carbon fiber X is exposed on a surface of the sheet, and when a depth from a highest point of the sheet to a deepest part of the sheet in a thickness direction is taken as 100% in observation of the surface of a region of 1 mm×1 mm, an area S occupied by the sheet in a section perpendicularly to the thickness direction at a position of 40% from the highest point of the sheet in the thickness direction is 65% or more.

[5] The thermally conductive sheet according to any one of [1] to [4], having a thermal resistance value of 0.024° C.·in²/W or less.

[6] The thermally conductive sheet according to any one of [1] to [5], having a thickness of 50 to 900 μm.

Advantageous Effects of Invention

According to the present invention, a thermally conductive sheet in which the thermal resistance value is effectively reduced by polishing the surface, resulting in a sheet having a low thermal resistance value can be provided.

DESCRIPTION OF EMBODIMENTS

[Thermally Conductive Sheet]
The thermally conductive sheet of the present invention is a thermally conductive sheet comprising: a matrix comprising an organic polymer, and a carbon fiber X, the carbon fiber X being oriented in the thickness direction of the sheet, wherein the proportion of a carbon fiber (A) having a fiber length of 100 μm or less is 40% or more and the proportion of a carbon fiber (B) having a fiber length of 200 μm or more is 3 to 13% of the carbon fiber X.

Hereinafter, the thermally conductive sheet of the present invention will be described in detail.

Figure 1:
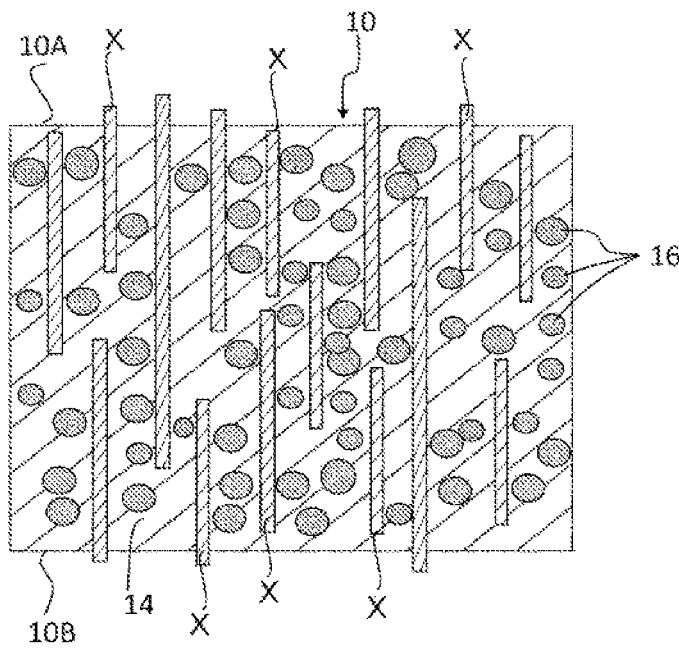
FIG. 1 is a schematic section view showing one embodiment of a thermally conductive sheet of the present invention.

FIG. 1 shows a thermally conductive sheet according to one embodiment of the present invention. The present invention is not limited to the content of the drawings.

The thermally conductive sheet 10 according to the present embodiment comprises a matrix 14 comprising an organic polymer, and a carbon fiber X, and specifically, the carbon fiber X is dispersed in the matrix 14, and the carbon fiber X is oriented in the thickness direction of the thermally conductive sheet 10. The carbon fiber X oriented in this way improves the thermal conductive properties of the thermally conductive sheet 10.

The state in which the carbon fiber X is oriented in the thickness direction of the thermally conductive sheet 10 herein refers to a state in which the major axis direction of more than 60% of the carbon fiber X in terms of a number percentage faces a direction in a range of within 200 from the thickness direction of the thermally conductive sheet 10. Such a state of orientation can be ascertained by observing a section cut along the thickness direction of the thermally conductive sheet 10 with an electron microscope.

As shown in FIG. 1, a part of the carbon fiber X is preferably exposed on the surface of the sheet. This makes it easy to enhance the thermal conductivity in the thickness direction, thereby improving the heat dissipation properties. As described below, a scale-like carbon powder, which is not shown in the drawings, may be comprised together with the carbon fiber X.

Figure 2:
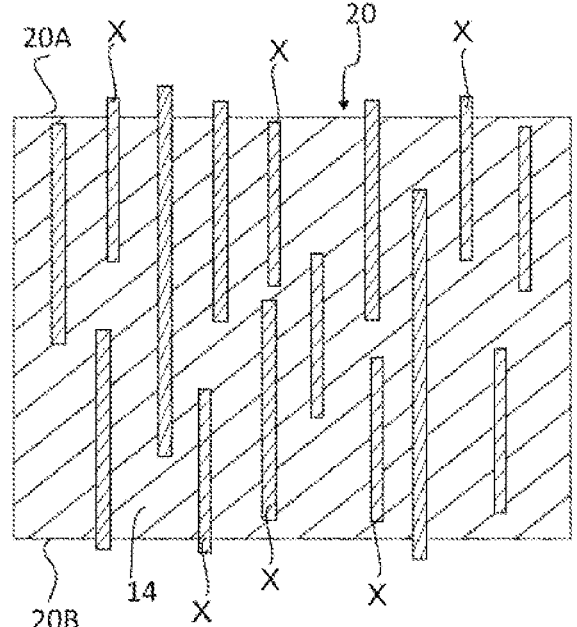
FIG. 2 is a schematic section view showing another embodiment of a thermally conductive sheet of the present invention.

The thermally conductive sheet 10 may further comprise a non-anisotropic filler 16. Comprising the non-anisotropic filler 16 together with the carbon fiber X makes it easy to form a thermal conduction path and improve the thermal conductive properties of the sheet in the thickness direction. The non-anisotropic filler 16 is not an essential component in the present invention, and a thermally conductive sheet 20 that does not comprise the non-anisotropic filler 16 is possible, as shown in FIG. 2. The thermally conductive sheet 20 is the same as the thermally conductive sheet 10, except for not comprising the non-anisotropic filler 16.

Hereinafter, each component that constitutes the thermally conductive sheet of the present invention will be described in detail.

(Carbon Fiber X)

The carbon fiber X is constituted by a plurality of carbon fibers each having a different fiber length. In the present invention, the proportion of the carbon fiber (A) having a fiber length of 100 μm or less is 40% or more of the carbon fiber X and the proportion of the carbon fiber (B) having a fiber length of 200 m or more is 3 to 13% of the carbon fiber X.

When the proportion of the carbon fiber (A) having a fiber length of 100 m or less is less than 40%, the effect of reducing the thermal resistance value due to polishing of the surface of the thermally conductive sheet is reduced. In order to reduce the thermal resistance value after polishing, the thermal resistance value before polishing is preferably reduced. From such a viewpoint, the proportion of the carbon fiber (A) having a fiber length of 100 μm or less is preferably 43% or more, more preferably 45% or more, and further preferably 47% or more.

The proportion of the carbon fiber (A) having a fiber length of 100 m or less means the proportion of the number of the carbon fiber (A) having a fiber length of 100 μm or less in the whole carbon fiber X.

In the present invention, the proportion of the carbon fiber (B) having a fiber length of 200 μm or more is 3 to 13%, as described above. When the proportion of the carbon fiber (B) having a fiber length of 200 m or more is less than 3%, the effect of reducing the thermal resistance value due to polishing of the thermally conductive sheet is reduced. On the other hand, when the proportion of the carbon fiber (B) having a fiber length of 200 m or more is more than 13%, the thermal resistance value before polishing is increased, so that the thermal resistance value after polishing is also increased.

From the viewpoint of reducing the thermal resistance value of the thermally conductive sheet after polishing, the proportion of the carbon fiber (B) having a fiber length of 200 μm or more is preferably 3 to 11%, more preferably 3 to 8%, and further preferably 3 to 5%.

The proportion of the carbon fiber (B) having a fiber length of 200 m or more means the proportion of the number of the carbon fiber (B) having a fiber length of 200 μm or more in the whole carbon fiber X.

The proportion of the carbon fiber (C) having a fiber length of 50 m or less is preferably 5% or less of the carbon fiber X. The proportion of the carbon fiber (C) having a fiber length of 50 μm or less being 5% or less makes it easy to improve the effect of reducing the thermal resistance value by polishing. The proportion of the carbon fiber (C) is preferably 4% or less, and more preferably 3% or less.

The proportion of the carbon fiber (C) having a fiber length of 50 m or less means the proportion of the number of the carbon fiber (C) having a fiber length of 50 μm or less in the whole carbon fiber X.

The average fiber length D50 of the carbon fiber X is preferably 50 to 150 μm, more preferably 70 to 130 μm, and further preferably 80 to 120 μm. The average fiber length D50 of the carbon fiber X being these lower limit values or more makes it easy for the carbon fibers to come into contact, so that heat transmission paths are easily secured. The average fiber length D50 of the carbon fiber X being these upper limit values or less makes it easy to highly fill carbon fibers in the matrix.

The proportions of the carbon fiber (A), carbon fiber (B), and carbon fiber (C) in the carbon fiber X, and the average fiber length D50 described above can be determined from a fiber length distribution curve in which the carbon fiber X is used as the sample, the abscissa represents the fiber length, and the ordinate represents the cumulative frequency. The fiber length distribution curve is a fiber length distribution curve based on the number, obtained by sequential integration in order from a carbon fiber having the shortest fiber length.

The fiber length distribution curve can be formed by microscopy of the carbon fiber X. For example, the fiber length of 2000 or more carbon fibers that constitute the carbon fiber X is measured using an electron microscope or an optical microscope to form the fiber length distribution curve, which allows the proportions of the carbon fiber (A), carbon fiber (B), and carbon fiber (C) to be calculated. The average fiber length D50 means the fiber length corresponding to the 50% cumulative frequency. The fiber length distribution curve is formed by eliminating fibers having a short fiber length of less than 30 μm. More specifically, the carbon fiber X which is used as the measurement sample can be prepared by being isolated from the thermally conductive sheet. The fiber length can be measured using an image analysis software "WinROOF" manufactured by MITANI CORPORATION after observing the above carbon fiber X with an optical microscope to obtain an observation image.

The carbon fiber X is a filler having a high aspect ratio and is specifically a filler having an aspect ratio of exceeding 2, and the aspect ratio is preferably 5 or more. Setting the aspect ratio to larger than 2 makes it easy to orient the carbon fiber in the thickness direction, so that the thermal conductive properties of the thermally conductive sheet 10 are enhanced easily.

The upper limit of the aspect ratio is not particularly limited, but is 100 in practical use.

The aspect ratio of the carbon fiber means fiber length/ diameter of fiber.

The content of the carbon fiber X in the thermally conductive sheet is preferably 30 to 500 parts by mass, and more preferably 50 to 300 parts by mass based on 100 parts by mass of the matrix. Setting the content of the carbon fiber X to these lower limit values or more makes it easy to enhance the thermal conductive properties, and setting the content to the upper limit values or less easily makes the viscosity of the mixed composition, which will be mentioned later, proper, thereby making the orientation of the carbon fiber X good.

The carbon fiber X is preferably constituted by using two or more carbon fibers each having a different average fiber length as the raw material, and more specifically, a short fiber length carbon fiber component having an average fiber length of 50 to 120 μm and a long fiber length carbon fiber component having an average fiber length of more than 120 μm are preferably combined.

The short fiber length carbon fiber component is preferably 20 to 490 parts by mass, and more preferably 40 to 290 parts by mass based on 100 parts by mass of the matrix.

The long fiber length carbon fiber component is preferably 3 to 100 parts by mass, and more preferably 5 to 70 parts by mass based on 100 parts by mass of the matrix.

From the viewpoint of enhancing the effect of reducing the thermal resistance value due to polishing of the thermally conductive sheet and reducing the thermal resistance value after polishing, the mass ratio of the short fiber length carbon fiber component to the long fiber length carbon fiber component (short fiber length carbon fiber component/long fiber length carbon fiber component) is preferably 1.5 to 55, and more preferably 3 to 20.

The average fiber length of the above-described short fiber length carbon fiber component is preferably 70 to 115 μm, and more preferably 90 to 110 μm.

The average fiber length of the above-described long fiber length carbon fiber component is preferably 130 to 300 μm, and more preferably 140 to 260 μm.

With respect to the average fiber length of each of the short fiber length carbon fiber component and the long fiber length carbon fiber component that are blended as the raw material, fiber lengths of arbitrary 50 carbon fibers are measured using an electron microscope or an optical microscope, and the average value of them can be adopted as the average fiber length.

The carbon fiber X is preferably a graphitized carbon fiber. A graphitized carbon fiber has a high thermal conductivity in its fiber axis direction because crystal planes of graphite run in the fiber axis direction. Therefore, by allowing fiber axis directions of the graphitized carbon fiber to face uniformly in a predetermined direction, the thermal conductivity in a particular direction can be enhanced.

The carbon fiber X has a thermal conductivity of, though not limited to, generally 60 W/m·K or more, and preferably 400 W/m·K or more along a direction of having anisotropy (that is, major axis direction). The carbon fiber X has a thermal conductivity of, for example, 2000 W/m·K or less although the upper limit is not particularly limited. The thermal conductivity can be measured by a laser flash method or a method in accordance with ASTM D5470.

The thermally conductive sheet preferably comprises a scale-like carbon powder together with the carbon fiber X. Containing the scale-like carbon powder can further enhance the effect of reducing the thermal resistance value due to polishing of the thermally conductive sheet.

The content of the scale-like carbon powder in the thermally conductive sheet is preferably 1 to 50 parts by mass, more preferably 5 to 40 parts by mass, and still more preferably 10 to 30 parts by mass based on 100 parts by mass of the matrix. When the content of the scale-like carbon powder is these lower limit values or more, the effect of reducing the thermal resistance value due to polishing of the thermally conductive sheet can be further enhanced, and when the content is these upper limit values or less, the viscosity of the mixed composition, which will be mentioned later, is easily made proper, so that the orientation of the scale-like carbon powder is made good.

The aspect ratio of the scale-like carbon powder exceeds 2, and the aspect ratio is preferably 5 or more. Setting the aspect ratio to larger than 2 makes it easy to orient the scale-like carbon powder in the thickness direction, so that the thermal conductive properties of the thermally conductive sheet are enhanced easily. The upper limit of the aspect ratio is not particularly limited, but is 100 in practical use. The aspect ratio of the scale-like carbon powder means the length/thickness of the scale-like carbon powder in the major axis direction.

The scale-like carbon powder is preferably a scale-like graphite powder. The scale-like graphite powder has a high thermal conductivity in its in-plane direction because crystal planes of graphite run in the in-plane direction of the scale plane. Therefore, by allowing scale planes of the scale-like graphite powder to face uniformly in a predetermined direction, the thermal conductivity in a particular direction can be enhanced.

As the above-described graphitized carbon materials, such as the graphitized carbon fiber and the scale-like graphite powder, products obtained by graphitizing the following raw materials can be used. Examples thereof include a condensed polycyclic hydrocarbon compound, such as naphthalene, and a condensed heterocyclic compound, such as PAN (polyacrylonitrile) or pitch, and graphitized mesophase pitch having a high degree of graphitization, polyimide, or polybenzazole in particular is preferably used. For example, by using mesophase pitch, the pitch is oriented in the fiber axis direction due to its anisotropy in the spinning step which will be mentioned later, so that a graphitized carbon fiber having excellent thermal conductive properties in the fiber axis direction can be obtained.

The graphitized carbon fiber obtained such that, to raw materials, treatments of spinning, infusibilization, and carbonization are conducted in sequence, and pulverization or cutting is conducted to a predetermined particle diameter, and thereafter graphitization is conducted, or the graphitized carbon fiber such that carbonization is conducted, pulverization or cutting is then conducted, and thereafter graphitization is conducted can be used. When pulverization or cutting is conducted before graphitization, a condensation polymerization and a cyclization reaction progress easily on a surface newly exposed due to pulverization during the graphitization treatment, and therefore a graphitized carbon fiber having thermal conductive properties further improved by enhancing the degree of graphitization can be obtained. When, on the other hand, pulverization is conducted after graphitizing a spun carbon fiber, the carbon fiber after graphitization is rigid and therefore is easily pulverized, so that a carbon fiber powder having a relatively narrow fiber length distribution can be obtained by brief pulverization.

(Non-Anisotropic Filler)

The thermally conductive sheet of the present invention preferably comprises a non-anisotropic filler. The non-anisotropic filler is a thermally conductive filler contained in the thermally conductive sheet separately from the carbon fiber X, and is a material which, together with the carbon fiber X, imparts thermal conductive properties to the thermally conductive sheet. By filling the non-anisotropic filler, an increase in the viscosity is suppressed, making the dispersibility good in the stage prior to curing into a sheet. In addition, in the carbon fibers X, when, for example, the fiber length is large, it is difficult to increase the contact area between the fillers, but when the non-anisotropic filler fills the space between the anisotropic fillers, heat transfer paths can thereby be formed, so that the thermally conductive sheet having a high thermal conductivity is obtained.

The non-anisotropic filler is a filler whose shape is substantially free of anisotropy, and is a filler such that even in an environment where the carbon fiber X is oriented in a predetermined direction, such as an environment, which will be mentioned later, where lines of magnetic force are generated or shear force is applied, the non-anisotropic filler 16 is not oriented in the predetermined direction.

The non-anisotropic filler has an aspect ratio of 2 or less, and preferably 1.5 or less. When the non-anisotropic filler having a low aspect ratio is contained, the filler having thermal conductive properties is thereby properly interposed in the space between the carbon fibers X, so that the thermally conductive sheet having a high thermal conductivity is obtained. In addition, by setting the aspect ratio to 2 or less, an increase in the viscosity of the mixed composition which will be mentioned later is prevented, enabling the thermally conductive sheet to be highly filled.

Specific examples of the non-anisotropic filler include a metal, a metal oxide, a metal nitride, a metal hydroxide, a carbon material, and an oxide, a nitride, and a carbide other than the metal oxide, the metal nitride, and a metal carbide. Examples of the shape of the non-anisotropic filler include a spherical shape and an indefinite-form powder.

In the non-anisotropic filler, examples of the metal include aluminum, copper, and nickel, examples of the metal oxide include aluminum oxide (alumina), magnesium oxide, and zinc oxide, and examples of the metal nitride include aluminum nitride. Examples of the metal hydroxide include aluminum hydroxide. Examples of the carbon material include spheroidal graphite. Examples of the oxide, the nitride, and the carbide other than the metal oxide, the metal nitride, and the metal carbide include quartz, boron nitride, and silicon carbide.

Among these described above, the non-anisotropic filler is preferably selected from the group consisting of alumina, aluminum, zinc oxide, boron nitride, and aluminum nitride, aluminum and alumina in particular is preferable from the viewpoint of filling properties and thermal conductivity, and alumina is more preferable.

As the non-anisotropic filler, those described above may be used singly, or two or more of those described above may be used together.

The average particle diameter of the non-anisotropic filler is preferably 0.1 to 50 μm, and more preferably 0.5 to 35 μm. The average particle diameter is particularly preferably 1 to 15 μm. By setting the average particle diameter to 50 μm or less, a defect such as disturbing the orientation of the carbon fiber X, or the like is made unlikely to occur. By setting the average particle diameter to 0.1 μm or more, the specific surface area of the non-anisotropic filler is not made larger than needed, making the viscosity of the mixed composition unlikely to increase even when a large amount is blended and making it easy to highly fill the non-anisotropic filler.

With respect to the non-anisotropic filler, for example, at least two non-anisotropic fillers each having a different average particle diameter may be used as the non-anisotropic filler.

The average particle diameter of the non-anisotropic filler can be measured by observation with an electron microscope or the like. More specifically, the particle diameters of arbitrary 50 non-anisotropic fillers are measured using, for example, an electron microscope or an optical microscope, and the average value (arithmetical mean value) can be adopted as the average particle diameter. Alternatively, the average particle diameter is a volume average particle diameter of the particle size distribution measured by a laser diffraction scattering method (JIS R1629).

The content of the non-anisotropic filler is preferably in a range of 100 to 800 parts by mass, and more preferably in a range of 150 to 700 parts by mass based on 100 parts by mass of the matrix.

By setting the content of the non-anisotropic filler to 100 parts by mass or more, the amount of the non-anisotropic filler interposed in the space between the carbon fiber X is made sufficient, making the thermal conductive properties good. On the other hand, by setting the content to 800 parts by mass or less, an effect of enhancing the thermal conductive properties corresponding to the content can be obtained, and the heat conduction due to the carbon fiber X is not inhibited by the non-anisotropic filler. Further, by setting the content within the range of 150 to 700 parts by mass, the thermal conductive properties of the thermally conductive sheet are made excellent and the viscosity of the mixed composition is made suitable.

(Matrix)

The thermally conductive sheet comprises a matrix comprising an organic polymer. The matrix is an organic polymer, such as an elastomer or a rubber, and a product formed by curing a polymer composition (curable polymer composition) in a liquid form, the polymer composition comprising a mixed system such as the one comprising a base agent and a curing agent, may preferably be used. For example, the curable polymer composition may be a composition comprising an uncrosslinked rubber and a crosslinking agent, or a composition comprising: a monomer, a prepolymer, or the like; and a curing agent or the like. The curing reaction may be cold curing or heat curing.

Examples of the matrix which is formed from the curable polymer composition include silicone rubber. In the case of silicone rubber, addition reaction-curable type silicone is preferably used as the matrix (curable polymer composition). More specifically, a curable polymer composition comprising alkenyl group-containing organopolysiloxane and hydrogen organopolysiloxane may be used as the curable polymer composition.

Various synthetic rubbers other than the above-described rubber can be used as the rubber, and specific examples thereof include acrylic rubber, nitrile rubber, isoprene rubber, urethane rubber, ethylene propylene rubber, styrene/butadiene rubber, butadiene rubber, fluororubber, and butyl rubber. When any of these rubbers is used, the synthetic rubber may be crosslinked or left uncrosslinked (that is, uncured) in the thermally conductive sheet. Uncrosslinked rubber is used mainly in flow orientation.

When the synthetic rubber is crosslinked (that is, cured), the matrix may be, as described above, a product obtained by curing a curable polymer composition comprising: an uncrosslinked rubber comprising any of these synthetic rubbers; and a crosslinking agent.

As the elastomer, a thermoplastic elastomer, such as a polyester-based thermoplastic elastomer or a polyurethane-based thermoplastic elastomer, or a heat-curable type elastomer which is formed by curing a polymer composition in a liquid form of a mixed system comprising a base agent and a curing agent can be used. Examples of the elastomer include a polyurethane-based elastomer which is formed by curing a polymer composition comprising: a polymer having a hydroxy group; and isocyanate.

Among those described above, silicone rubber, or particularly addition reaction-curable type silicone is preferably used from the viewpoint that, for example, the matrix after curing is particularly soft and filling properties of the carbon fiber, and the scale-like carbon powder and non-anisotropic filler that are blended as necessary are good.

The polymer composition for forming the matrix may be a polymer composition comprising a single substance of a polymer compound, or may be a polymer composition comprising a polymer compound and a plasticizer. The plasticizer is suitably used when a synthetic rubber is used, and when the plasticizer is contained, the flexibility of the uncrosslinked polymer matrix can thereby be enhanced.

The content of the matrix, when expressed by a filling ratio on a volume basis (volume filling ratio), is preferably 20 to 50% by volume, and more preferably 25 to 45% by volume based on the total amount of the thermally conductive sheet.

(Additive)

In the thermally conductive sheet, various additives may further be blended in the matrix in a range where the function as the thermally conductive sheet is not impaired. Examples of the additive include at least one or more selected from a dispersant, a coupling agent, a pressure-sensitive adhesive, a fire retardant, an antioxidant, a coloring agent, an anti-settling agent, and the like. When the curable polymer composition is subjected to crosslinking, curing, or the like, as described above, a crosslinking accelerator, a curing accelerator, or the like that accelerates crosslinking or curing may be blended as an additive.

[Method for Producing Thermally Conductive Sheet]

The thermally conductive sheet of the present invention is preferably produced, for example, a method comprising the following steps (A) and (B) although the method is not particularly limited thereto.

Step (A): a step of obtaining an oriented molding such that a carbon fiber X is oriented along a direction to be a thickness direction in the thermally conductive sheet Step (B): a step of cutting the oriented molding into a sheet-like form to obtain a thermally conductive sheet Hereinafter, each step will be described in more detail.

<Step (A)>

In the step (A), for example, an oriented molding is molded from a mixed composition comprising: a polymer composition to be a raw material for a matrix; the carbon fiber X; and a scale-like carbon powder and a non-anisotropic filler that are blended as necessary. The mixed composition is preferably cured into an oriented molding. More specifically the oriented molding can be obtained by a production method by magnetic field orientation or a production method by flow orientation, but among these, the production method by magnetic field orientation is preferable.

(Production Method by Magnetic Field Orientation)

In the production method by magnetic field orientation, the mixed composition comprising: a polymer composition in a liquid form to be a matrix after curing; the carbon fiber X; and a scale-like carbon powder and a non-anisotropic filler that are blended as necessary is injected inside a casting container or the like, and is then placed in a magnetic field to orient the carbon fiber X and the scale-like carbon powder that is blended as necessary along the magnetic field, and the polymer composition is thereafter cured, thereby obtaining an oriented molding. The oriented molding is preferably molded into a block-like form.

A release film may be disposed at a portion which is to be in contact with the mixed composition inside the die. As the release film, for example, a resin film having good releasability, or a resin film such that one surface is release-treated with a release agent or the like is used. Using a release film makes it easy to release the oriented molding from the die.

The viscosity of the mixed composition which is used in the production method by magnetic field orientation is preferably 10 to 300 Pa-s in order to subject the anisotropic filler to magnetic field orientation. By setting the viscosity to 10 Pa-s or more, each filler is made unlikely to settle. By setting the viscosity to 300 Pa-s or less, the fluidity is made good, the carbon fiber X and the scale-like carbon powder that is blended as necessary are oriented properly in the magnetic field, and a defect such as taking too much time for orientation does not occur. The viscosity refers to viscosity measured using a rotational viscometer (Brookfield viscometer DV-E, Spindle SC4-14) at a rotational speed of 10 rpm at 25° C.

However, when a carbon fiber X, a scale-like carbon powder, or a non-anisotropic filler which are unlikely to settle is used, or an additive, such as an anti-settling agent, is combined, the viscosity of the mixed composition may be set to less than 10 Pa-s.

Examples of a source for generating lines of magnetic force, the source for applying the lines of magnetic force, in the production method by magnetic field orientation include a superconducting magnet, a permanent magnet, and an electromagnet, and a superconducting magnet is preferable from the viewpoint that a magnetic field with a high magnetic flux density can be generated. The magnetic flux density of the magnetic field which is generated from these sources for generating lines of magnetic force is preferably 1 to 30 tesla. Setting the magnetic flux density to 1 tesla or more enables a carbon fiber to be oriented easily. Setting the magnetic flux density to 30 tesla or less enables practical production.

Curing of the polymer composition may be conducted by heating, and may be conducted at a temperature of, for example, about 50 to about 150° C. The heating time is, for example, about 10 minutes to about 3 hours.

(Production Method by Flow Orientation)

In the production method by flow orientation, shear force may be applied to the mixed composition to produce a preliminary sheet such that the carbon fiber X and a scale-like carbon powder that is blended as necessary are oriented in the plane direction, a plurality of the preliminary sheets may be laminated to produce a laminated block, and the laminated block may be used as the oriented molding.

More specifically, in the production method by flow orientation, the carbon fiber X, and a scale-like carbon powder and a non-anisotropic filler that are blended as necessary, and various additives are first mixed with the polymer composition to stir a resultant mixture, thereby preparing a mixed composition in which mixed solid substances are uniformly dispersed. The polymer compound which is used for the polymer composition may be a polymer compound comprising a polymer compound in a liquid form at normal temperature (23° C.) or may be a polymer compound comprising a polymer compound in a solid form at normal temperature. Further, the polymer composition may comprise a plasticizer.

The mixed composition has a relatively high viscosity such that shear force is applied when the mixed composition is stretched into a sheet-like form, and specifically, the viscosity of the mixed composition is preferably 3 to 500 Pa-s. A solvent is preferably blended in the mixed composition in order to obtain the viscosity.

Next, the mixed composition is molded into a sheet-like form (preliminary sheet) by stretching flatly while shear force is given to the mixed composition. By applying the shear force, the carbon fiber X and the scale-like carbon powder that is blended as necessary can be oriented in the shear direction. With respect to means for molding the sheet, a base film may be coated with the mixed composition, for example, with an applicator for application, such as a bar coater or a doctor blade, or by extrusion molding or ejection from a nozzle, and thereafter, drying may be conducted or the mixed composition may be semi-cured as necessary. The thickness of the preliminary sheet is preferably set to about 50 to about 5000 am. In the preliminary sheet, the carbon fiber X and the scale-like carbon powder that is blended as necessary are oriented in a direction along the plane direction of the sheet.

Subsequently a plurality of the preliminary sheets may be stacked and laminated in such a way that the orientation directions are the same, and thereafter the preliminary sheets may be allowed to adhere to one another with a heat press or the like while the mixed composition is cured as necessary by heating, irradiation with an ultraviolet ray, or the like to form a laminated block, and the laminated block may be used as the oriented molding.

<Step (B)>

In the step (B), the oriented molding obtained in the step (A) is cut by slicing or the like perpendicularly to a direction of the orientation of the carbon fiber X, thereby obtaining a thermally conductive sheet. The slicing may be conducted with, for example, a shearing blade or laser. In the thermally conductive sheet, a part of the carbon fiber X is exposed from the matrix on each surface which is a section by cutting, such as slicing. Almost all the exposed carbon fiber X is oriented in the thickness direction without falling down.

The oriented molding herein preferably has a type E hardness specified in JIS K6253 of 10 to 80, and more preferably 20 to 70. When the E hardness is 10 to 80, the matrix is more positively cut than the carbon fiber X, in slicing the sheet-like molding, and the carbon fiber X can easily be exposed.

In the thermally conductive sheet of the present invention produced through the above-described steps (A) and (B), the thermal resistance value can be effectively reduced by polishing the surface as described above, resulting in a thermally conductive sheet having a low thermal resistance value. Therefore, a step (C) which is a step of polishing a surface of the thermally conductive sheet is preferably provided after the steps (A) and (B).

<Step (C)>

The step (C) is a step of polishing a surface of the thermally conductive sheet.

In the step (C), the surface of the thermally conductive sheet obtained in the step (B), on which the carbon fiber X is exposed, is polished. The polishing of the surface may be conducted using, for example, sandpaper, a polishing film, a polishing cloth, and a polishing belt.

Sandpaper having an average grain diameter (D50) of contained abrasive grains of 0.1 to 100 μm as a characteristic of the sandpaper is preferable, and sand paper more preferably has an average grain diameter of contained abrasive grains of 9 to 60 μm. The particle size of abrasive grains of sandpaper for example is preferably #120 to 20000, preferably #300 to 15000, and more preferably #320 to 4000.

As the polishing method, a method in which, for example, polishing is conducted by allowing sandpaper to abut on the surface of the thermally conductive sheet continuously in the same linear direction, polishing is conducted by reciprocating sandpaper on the surface of the thermally conductive sheet within a certain distance, polishing is conducted by rotating sandpaper in the same direction on the surface of the thermally conductive sheet, or polishing is conducted by allowing sandpaper to abut on the surface of the thermally conductive sheet in various directions can be used.

With respect to the extent of polishing, the polishing may be conducted, for example, while the surface state is being observed, but in the case of reciprocation polishing for example, 1 to 300 times of reciprocation is preferable, more preferably 2 to 200 times, and still more preferably 3 to 50 times, and specifically, polishing is preferably conducted to such an extent that the protruding length of the carbon fiber X becomes 100 μm or less. Further, polishing is more preferably conducted to such an extent that the protruding length becomes 50 μm or less.

[Surface State of Thermally Conductive Sheet]

In the thermally conductive sheet of the present invention, as described above, a part of the carbon fiber X is preferably exposed on the surface of the sheet. In addition, the surface state of the thermally conductive sheet is preferably as described below, from the viewpoint of reducing the thermal resistance value.

Figure 3:
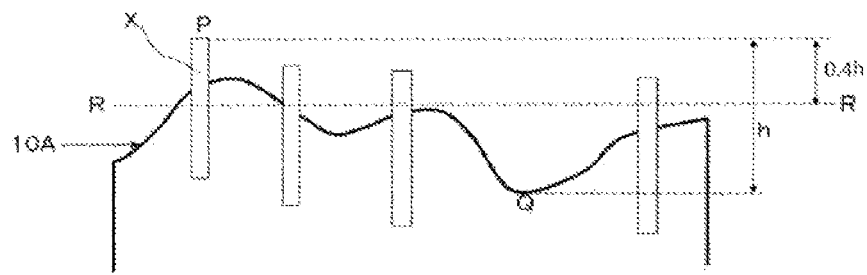
FIG. 3 is a diagram showing a method for calculating an area S occupied by the sheet.

A preferred surface state of the thermally conductive sheet will be described with reference to FIG. 3 which schematically shows the section near the surface. When the depth h from the highest point P of the sheet to the deepest part Q of the sheet in the thickness direction is taken as 100% in the observation of the thermally conductive sheet in a region of 1 mm×1 mm from the surface, the area S occupied by the sheet in the section R perpendicularly to the thickness direction at a position of 40% from the highest point P in the thickness direction of the sheet (that is, a position of 0.4 h from the highest point P in the thickness direction of the sheet) is preferably 65% or more.

When the area S occupied by the sheet is 65% or more, the thermal resistance value of the thermally conductive sheet can be further reduced. The reason is uncertain, but it is considered that the thermally conductive sheet having such a specific surface state means that the sheet is relatively smooth near the outermost surface of the sheet, which makes it easy for the sheet to come into contact with a heating element or the like, so that the thermal resistance value is reduced.

From the viewpoint of further reducing the thermal resistance value, the area S occupied by the sheet is preferably 66% or more, and more preferably 68% or more. The upper limit of the above-described area occupied by the sheet is not particularly limited, but the area S occupied by the sheet is generally 95% or less.

The highest point P of the sheet is a portion that is positioned at the highest position of the sheet in an observation region, and is usually an edge portion of a carbon fiber X that is exposed from the surface. The deepest part Q of the sheet is a portion that is positioned at the innermost side of the sheet among recess parts in the surface 10A of the sheet in the observation region.

The area S occupied by the sheet in the section R perpendicularly to the thickness direction at a position of 40% from the highest point P in the thickness direction of the sheet (position of 0.4 h) means that, in the section R (area of 1 mm×1 mm), the proportion of the area in which the components constituting the sheet (for example, matrix and carbon fiber X) are present.

A region of 1 mm×1 mm is observed at 10 points, the above-described area occupied by the sheet at each point is determined, and the average value of them may be determined as the area S occupied by the sheet.

A thermally conductive sheet in which the area S occupied by the sheet is a certain area or more is, for example, obtained through the above-described step (A) to step (C), but the production method is not particularly limited.

The thermal resistance value of the thermally conductive sheet is preferably 0.024° C.·in$^2$/W or less, and more preferably 0.022° C.·in$^2$/W or less. When the thermal resistance value is such a value, a thermally conductive sheet that easily transmits heat from a heating element to a heat-dissipating element is made. The thermal resistance value is better when it is smaller, but is usually 0.001° C.·in$^2$/W or more. The thermal resistance value refers to the thermal resistance value in the thickness direction of the thermally conductive sheet.

The thermally conductive sheet having such a thermal resistance value is not particularly limited, but for example, can be obtained by producing a thermally conductive sheet in which the above-described sheet area S is a certain area or more.

<Various Surface Parameters (Spc, Sa, Sdr)>

The thermally conductive sheet of the present invention preferably has an arithmetic mean peak curvature (Spc) of 18000 (1/mm) or less. When the arithmetic mean peak curvature (Spc) is 18000 (1/mm) or less, the contact area where the surface of the sheet closely adheres to a heating element or the like is made large, so that the thermal resistance value can be reduced.

The arithmetic mean peak curvature (Spc) is preferably 17000 (1/mm) or less, and more preferably 16000 (1/mm) or less. The arithmetic mean peak curvature (Spc) is preferably 1000 (1/mm) or more, and more preferably 5000 (1/mm) or more.

The arithmetic mean peak curvature (Spc) is a parameter which is measured in accordance with ISO 25178 and represents the arithmetical mean of principal curvatures of the peaks in a defined region. When this value is small, it shows that the points to be in contact with a heating element or the like are rounded. On the other hand, when this value is large, it shows that the points to be in contact with a heating element or the like are sharp.

The positions of the rounded contact points are not certain, but, for example, an end portion or an end surface of the carbon fiber exposed on the surface, or a surface composed of an end portion of the carbon fiber and the surface of the matrix can be a rounded contact point.

The arithmetic mean peak curvature (Spc) can be calculated by measuring the surface profile in a predetermined measurement area (for example, 1 mm$^2$ two-dimensional region) with a commercially available laser microscope.

To make the arithmetic mean peak curvature (Spc) 18000 (1/mm) or less, a polishing treatment on the surface may be performed using sandpaper having a grain size of, for example, #120 to 20000 and appropriately setting the number of times of polishing according to the grain size. If necessary, the E hardness of the above-described oriented molding is set to about 10 to about 80, and after this oriented molding is sliced into a sheet-like form, the above-described polishing treatment may be performed.

The arithmetical mean height (Sa) of the surface of the thermally conductive sheet is preferably 20 μm or less, and more preferably 1 to 15 μm. When the arithmetical mean height (Sa) is 20 μm or less, the surface of the sheet has smoothness and the contact area where the surface of the sheet closely adheres to a heating element or the like is made large, so that the thermal resistance value can be reduced. The arithmetical mean height (Sa) can be measured utilizing a commercially available surface characteristics measuring apparatus, and can be measured specifically by the method described in Examples.

To make the arithmetical mean height (Sa) 20 μm or less, a polishing treatment on the surface may be performed using sandpaper having, for example, a relatively coarse grain size among various kinds of sandpaper having a grain size of #120 to 20000 and appropriately setting the number of times of polishing according to the grain size.

The surface of the thermally conductive sheet preferably has a developed interfacial area ratio (Sdr) of 70 or less, and more preferably 1 to 60. When the developed interfacial area ratio (Sdr) is 70 or less, the surface of the sheet has smoothness, and the contact area where the surface of the sheet closely adheres to a heating element or the like is made large, so that the thermal resistance value can be reduced even in a state where the carbon fiber is exposed from the surface of the thermally conductive sheet and the surface of the sheet is uneven.

The developed interfacial area ratio (Sdr) is an index indicating the amount of an increase in the developed area (surface area) in a defined region relative to the area of the defined region (for example, 1 mm$^2$), and a perfectly flat surface has a developed area ratio Sdr of 0. The developed interfacial area ratio (Sdr) can be measured by the method described in Examples.

To make the developed interfacial area ratio (Sdr) 70 or less, a polishing treatment on the surface may be performed using sandpaper having, for example, a relatively coarse grain size among various kinds of sandpaper having a grain size of #120 to 20000 and appropriately setting the number of times of polishing according to the grain size.

[Thickness]

The thickness of the thermally conductive sheet of the present invention may be appropriately selected according to the shape and intended use of an electronic device on which the sheet is loaded, but is preferably 50 to 900 μm, more preferably 50 to 800 μm, and further preferably 150 to 400 μm. The thermally conductive sheet of the present invention can make the thermal resistance value to a certain value or less, even when the sheet is relatively thin as described above.

[Use]

The thermally conductive sheet is used inside an electronic device or the like. Specifically, the thermally conductive sheet is interposed between a heating element and a heat-dissipating element, transfers heat generated at the heating element to a heat-dissipating element by heat conduction, and dissipates heat from the heat-dissipating element. Examples of the heating element herein include various electronic parts, such as CPU, a power amplifier, and a power source such as a battery, which are used inside an electronic device. Examples of the heat-dissipating element include a heat sink, a heat pipe, a heat pump, and a metal housing of an electronic device. The thermally conductive sheet is used in such a way that the surfaces closely adhere to a heating element and a heat-dissipating element, respectively and the thermally conductive sheet is compressed.

EXAMPLES

Hereinafter, the present invention will be described with reference to Examples in more detail, but the present invention is not limited at all by these Examples.

In the present Examples, the physical properties of the thermally conductive sheets were evaluated by the following methods.

[Proportion of Carbon Fiber for each Fiber Length, Average Fiber Length D50]

With respect to the carbon fiber X contained in the thermally conductive sheet, the proportion of the carbon fiber (A) having a fiber length of 100 m or less, the proportion of the carbon fiber (B) having a fiber length of 200 m or more, and the proportion of the carbon fiber (C) having a fiber length of 50 m or less were calculated as follows.

The carbon fiber X was isolated from the thermally conductive sheet after polishing using a silicone dissolving agent (KSR-1, manufactured by Kanto Chemical Co., Inc.). Then, an observation image (image) was obtained from the resulting isolate using an optical microscope (digital microscope VHX-900, manufactured by KEYENCE CORPORATION), and thereafter, individual fiber length of about 2000 carbon fibers was measured with an image analysis software WinROOF2015 (manufactured by MITANI CORPORATION). Subsequently, a fiber length distribution curve in which the abscissa represents the fiber length and the ordinate represents the cumulative frequency (based on the number) was obtained. Then, the proportions of each of the carbon fiber (A), the carbon fiber (B), and the carbon fiber (C) in the carbon fiber X were determined from the fiber length distribution curve. At this time, the fiber length distribution curve was formed by eliminating fibers having a short fiber length, such as less than 30 μm.

In addition, the average fiber length D50 of the carbon fiber X was determined from the fiber length distribution curve obtained as described above.

[Arithmetic Mean Peak Curvature (Spc), Arithmetical Mean Height (Sa), Developed Interfacial Area Ratio (Sdr)]

The arithmetic mean peak curvature (Spc), the arithmetical mean height (Sa), and the developed interfacial area ratio (Sdr) of the thermally conductive sheet after polishing were measured as follows.

Surface characteristics analysis using a laser microscope (VK-X150, manufactured by KEYENCE CORPORATION) was performed in accordance with ISO 25178. Specifically, a surface profile of a two-dimensional region having a surface area of 1000 μm×1000 μm was measured with a lens of 10 magnifications by a laser method. The average value obtained by measurement at three points in the same sample was adopted as the arithmetic mean peak curvature Spc.

Measurement for the arithmetical mean height (Sa) and the developed interfacial area ratio (Sdr) as well as the arithmetic mean peak curvature (Spc) was performed at three points in the same sample, and the average values of those were adopted as the arithmetical mean height (Sa) and the developed interfacial area ratio (Sdr), respectively.

[Thermal Resistance Value]

Figure 4:
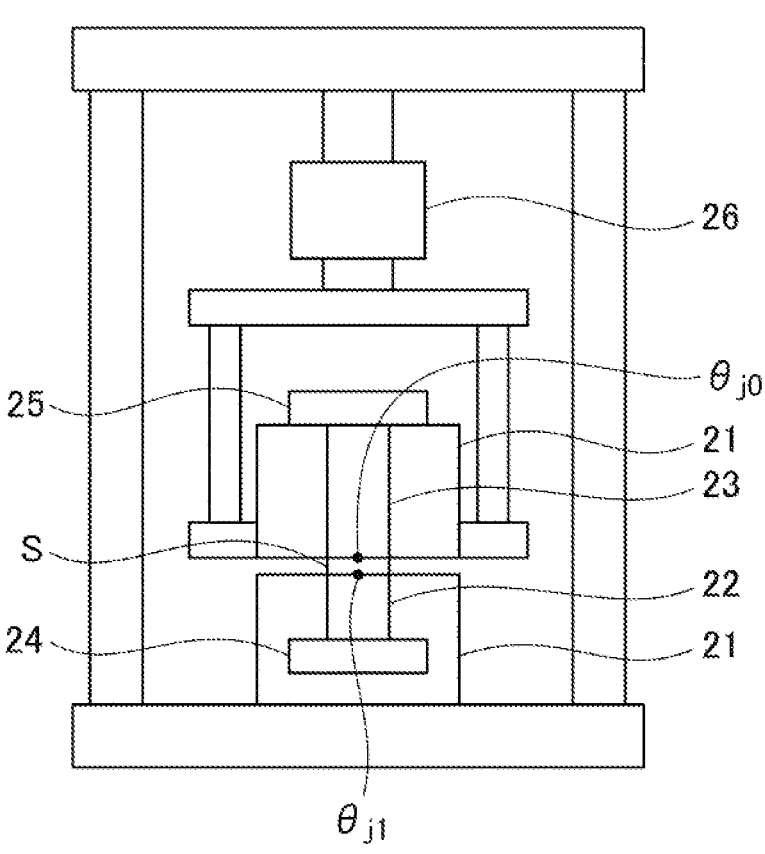
FIG. 4 is an outline diagram of a thermal resistance measuring machine.

The thermal resistance value was measured using a thermal resistance measuring machine as shown in FIG. 4 by the method described below.

Specifically, a test piece S having a size of 30 mm×30 mm×0.2 mmt for the present test was prepared for each sample. Each test piece S was pasted on a copper block 22 such that a measurement face has a size of 25.4 mm×25.4 mm and side faces are covered with a thermal insulator 21, and was held between the copper block and an upper copper block 23, and load was applied with a load cell 26 to set the thickness in such a way as to become 80% of the original thickness. The lower copper block 22 is in contact with a heater 24. The upper copper block 23 is covered with the thermal insulator 21 and is connected to a heat sink 25 with a fan. Subsequently, the heater 24 was heated by a calorific value of 25 W, and 10 minutes later when the temperature would reach an almost stationary state, the temperature of the upper copper block 23 ($\theta_{jo}$), the temperature of the lower copper block 22 ($\theta_{j1}$), and the calorific value of the heater (Q) were measured to determine the thermal resistance value of each sample from the following expression (1).

$$\text{Thermal resistance}=(\theta_{j1}-\theta_{jo})/Q \qquad \text{Expression (1)}$$

wherein, $\theta_{j1}$ represents the temperature of the lower copper block 22, $\theta_{jo}$ represents the temperature of the upper copper block 23, and Q represents the calorific value.

In measurement for the thermal resistance value, both the thermally conductive sheet before polishing and the thermally conductive sheet after polishing were used as samples, and the thermal resistance value before polishing R1 and the thermal resistance value after polishing R2 were determined.

The thermal resistance value after polishing R2 was evaluated according to the following criteria.

(Evaluation Criteria of Thermal Resistance Value R2)

A R2 was 0.022° C.·in²/W or less

B R2 was more than 0.022° C.·in²/W and 0.024° C.·in²/W or less

C R2 was more than 0.024° C.·in²/W and 0.026° C.·in²/W or less

D R2 was more than 0.026° C.·in²/W

The thermal resistance improvement rate (%) was calculated by the following expression and evaluated according to the following criteria. A higher thermal resistance improvement rate means a higher effect of reducing the thermal resistance by polishing.

Thermal resistance improvement rate (%)=100×(R1−R2)/R1 (Evaluation Criteria of Thermal Resistance Improvement Rate (%))

A The thermal resistance improvement rate was 45% or more

B The thermal resistance improvement rate was 40% or more and less than 45%

C The thermal resistance improvement rate was 30% or more and less than 40%

D The thermal resistance improvement rate was less than 30%

[Area S Occupied by Sheet]

A surface of a region of 1 mm×1 mm of the thermally conductive sheet was observed by surface characteristics analysis using a laser microscope (VK-X150, manufactured by KEYENCE CORPORATION), and the obtained height MAP was analyzed by an image analysis software WinROOF2015 (manufactured by MITANI CORPORATION), thereby measuring the proportion of the area at each position in the thickness direction. Then, from the measurement results, the depth from the highest point of the sheet to the deepest part of the sheet in the thickness direction was taken as 100%, and the area occupied by the sheet in the section perpendicularly to the thickness direction at a position of 40% from the highest point of the sheet in the thickness direction was determined. The surface of a region of 1 mm×1 mm was measured at 10 points, the area occupied by the sheet at each measurement point was determined, and the average value of them was calculated and adopted as the area S occupied by the sheet. Both the thermally conductive sheet before polishing and the thermally conductive sheet after polishing were used as samples, and the area S occupied by the sheet was determined for both samples.

[Orientation Rate]

A section of each thermally conductive sheet prepared was observed with an electron microscope to extract 100 carbon fibers to determine the number of the carbon fibers oriented in the thickness direction of the sheet in 100 carbon fibers. The thermally conductive sheet in which 61 carbon fibers (61%) or more are oriented was rated as A, and the thermally conductive sheet in which less than 60 carbon fibers (60%) were oriented was rated as B.

The carbon fiber in which the major axis direction faces a direction in a range of within 20° from the thickness direction of the thermally conductive sheet was decided as oriented.

In the production of the thermally conductive sheet, the following components were used.

(Matrix)

An addition reaction type organopolysiloxane including an alkenyl group-containing organopolysiloxane as the base agent, and a hydrogen organopolysiloxane as the curing agent.

(Carbon Fiber X)

The following carbon fibers were used.

Carbon fiber 1 . . . graphitized carbon fiber having an average fiber length of 110 μm, an aspect ratio of 11, and a thermal conductivity of 1200 W/m·K Carbon fiber 2 . . . graphitized carbon fiber having an average fiber length of 150 μm, an aspect ratio of 15, and a thermal conductivity of 900 W/m·K Carbon fiber 3 . . . graphitized carbon fiber having an average fiber length of 200 μm, an aspect ratio of 20, and a thermal conductivity of 1200 W/m·K Scale-like graphite powder.. scaly, average particle diameter 130 μm, aspect ratio 10, thermal conductivity 550 W/m·K Aluminum oxide powder. . spherical, average particle diameter 3 μm, aspect ratio 1.0

Aluminum powder. . indefinite-form, average particle diameter 3 μm

Coupling agent. . n-decyltrimethoxysilane

Example 1

A mixed composition was obtained by mixing: the alkenyl group-containing organopolysiloxane and the hydrogen organopolysiloxane (100 parts by mass in total) as the matrix (polymer composition); 140 parts by mass of the carbon fiber 1; 10 parts by mass of the carbon fiber 2; 20 parts by mass of the scale-like graphite powder; 200 parts by mass of the aluminum oxide powder; 100 parts by mass of the aluminum powder; and 22 parts by mass of the coupling agent.

Subsequently the mixed composition was injected into a die whose thickness was set in such a way as to be sufficiently larger than that of each thermally conductive sheet, a magnetic field of 8T was applied in the thickness direction to orient the carbon fiber in the thickness direction, and the matrix was thereafter cured by heating at 80° C. for 60 minutes, thereby obtaining a block-like oriented molding.

Next, the block-like oriented molding was sliced into a sheet-like form having a thickness of 250 μm using a shearing blade, thereby obtaining a thermally conductive sheet (before polishing) such that the carbon fiber is exposed.

Subsequently, a thermally conductive sheet after polishing was obtained by conducting reciprocation polishing 50 times on each surface of the sheet-like molding with rough sandpaper A (grain size of #320) having an average grain diameter (D50) of abrasive grains of 60 μm. The thickness of the thermally conductive sheet was 200 μm.

Examples 2 to 6, Comparative Examples 1 to 4

A thermally conductive sheet was prepared in the same manner as in Example 1, except that the composition of the mixed composition was changed to that described in Table 1.

TABLE 1

| | | | Example | | | | | | Comparative Example | | | |
|---|---|---|---|---|---|---|---|---|---|---|---|---|
| | | | 1 | 2 | 3 | 4 | 5 | 6 | 1 | 2 | 3 | 4 |
| Mixed com-position (parts by mass) | Matrix | | 100 | 100 | 100 | 100 | 100 | 100 | 100 | 100 | 100 | 100 |
| | Carbon fiber X | Carbon fiber 1 | 140 | 120 | 100 | 130 | 140 | 110 | 140 | 0 | 0 | 30 |
| | | Carbon fiber 2 | 10 | 30 | 50 | 10 | 10 | 0 | 0 | 130 | 0 | 0 |
| | | Carbon fiber 3 | 0 | 0 | 0 | 0 | 0 | 30 | 0 | 0 | 123 | 110 |
| | Scale-like carbon powder | | 20 | 20 | 20 | 3 | 0 | 20 | 3 | 0 | 23 | 23 |
| | Aluminum oxide | | 200 | 200 | 200 | 200 | 200 | 200 | 200 | 200 | 200 | 200 |
| | Aluminum | | 100 | 100 | 100 | 100 | 100 | 100 | 100 | 100 | 100 | 100 |
| | Coupling agent | | 22 | 22 | 22 | 0 | 0 | 22 | 0 | 0 | 31 | 35 |
| Evalua-tion | Proportion of carbon fiber (C) having fiber length of 50 μm or less (%) | | 2.9 | 2.6 | 2.3 | 2.9 | 2.9 | 2.4 | 1.5 | 0.8 | 0 | 0.2 |
| | Proportion of carbon fiber (A) having fiber length of 100 μm or less (%) | | 50 | 48 | 46.1 | 50 | 50 | 40 | 51 | 37 | 2.9 | 9.3 |
| | Proportion of carbon fiber (B) having fiber length of 200 μm or less (%) | | 3.2 | 4.7 | 6.2 | 3.3 | 3.2 | 11.4 | 2.4 | 14 | 44 | 43 |

TABLE 1-continued

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| Average fiber length D50 of carbon fiber X (μm) | 100 | 102 | 104 | 100 | 100 | 110 | 99 | 120 | 188 | 165 |
| Thermal resistance value before polishing R1 ($°$ C. · in$^2$/W) | 0.035 | 0.033 | 0.036 | 0.035 | 0.040 | 0.042 | 0.035 | 0.036 | 0.050 | 0.045 |
| Thermal resistance value after polishing R2 ($°$ C. · in$^2$/W) | 0.020 | 0.021 | 0.024 | 0.021 | 0.024 | 0.023 | 0.025 | 0.026 | 0.030 | 0.027 |
| Thermal resistance improvement rate (%) 100 × (R1 − R2)/R1 | 43 | 36 | 33 | 40 | 40 | 45 | 29 | 28 | 40 | 41 |
| Evaluation of thermal resistance value after polishing R2 | A | A | B | A | B | B | C | C | D | D |
| Evaluation of thermal resistance improvement rate | B | C | C | B | B | A | D | D | B | B |
| Surface parameter Sa (μm) | 9.6 | 9.3 | 7.1 | 7.5 | 12.2 | 7.3 | 7.4 | 12.3 | 14.4 | 13.5 |
| Surface parameter Spc (1/mm) | 5302 | 5218 | 5267 | 5352 | 5876 | 5224 | 5625 | 6218 | 6212 | 6185 |
| Surface parameter Sdr | 6.9 | 7.2 | 6.9 | 7.1 | 8.4 | 7.3 | 7.8 | 8.8 | 8.5 | 8.9 |
| Area S (%) occupied by sheet at 40% depth position before polishing | 27.1 | 26.8 | 9.7 | 12.3 | 17.5 | 17.3 | 9.9 | 17.5 | 16.8 | 14.5 |
| Area S (%) occupied by sheet at 40% depth position after polishing | 75.4 | 73.8 | 68.8 | 68.4 | 65.5 | 70.1 | 64.1 | 61.8 | 61.5 | 62.1 |
| Orientation rate | A | A | A | A | A | A | A | A | A | A |

In the thermally conductive sheets of Examples 1 to 6, the proportion of the carbon fiber (A) having a fiber length of 100 μm or less and the proportion of the carbon fiber (B) having a fiber length of 200 μm or more in the carbon fiber X contained in the sheet were within a range defined in the present invention, so that the thermal resistance value was easily reduced by polishing, the thermal resistance value after polishing was low, and the heat dissipation properties were excellent. This seems that the surface characteristics near the outermost surface of the sheet were relatively smooth because the area S occupied by the sheet at a certain depth portion of the sheet after polishing was a large value in each Example.

In contrast, in the thermally conductive sheet of Comparative Example 1 in which the proportion of the carbon fiber (B) having a fiber length of 200 m or more was less than the amount defined in the present invention and the thermally conductive sheet of Comparative Example 2 in which the proportion of the carbon fiber (A) having a fiber length of 100 μm or less was less than the amount defined in the present invention, the effect of reducing the thermal resistance value due to polishing was small, so that their thermal resistance values after polishing were higher than the sheets of Examples.

In the thermally conductive sheets of Comparative Examples 3 and 4 in which the proportion of the carbon fiber (B) having a fiber length of 200 m or more was more than the amount defined in the present invention, while the effect of reducing the thermal resistance value by polishing was large, the thermal resistance value before polishing was high, and as a result, their thermal resistance values after polishing were higher than the sheets of Examples.

REFERENCE SIGNS LIST 10, 20 Thermally conductive sheet
14 Matrix
X Carbon fiber

21 Thermal insulator
22 Lower copper block
23 Upper copper block
24 Heater
25 Heat sink
26 Load cell
S Test piece
$θ_{j0}$ Temperature of upper copper block
$θ_{j1}$ Temperature of lower copper block

The invention claimed is:

1. A thermally conductive sheet comprising: a matrix comprising an organic polymer, and a carbon fiber X, the carbon fiber X being oriented in a thickness direction of the sheet,
   wherein a proportion of a carbon fiber (A) having a fiber length of 100 μm or less is 40% or more of the carbon fiber X and a proportion of a carbon fiber (B) having a fiber length of 200 μm or more is 3 to 13% of the carbon fiber X.

2. The thermally conductive sheet according to claim 1, wherein a proportion of a carbon fiber (C) having a fiber length of 50 μm or less is 5% or less of the carbon fiber X.

3. The thermally conductive sheet according to claim 1 further comprising a scale-like carbon powder.

4. The thermally conductive sheet according to claim 1, wherein a part of the carbon fiber X is exposed on a surface of the sheet, and when a depth from a highest point of the sheet to a deepest part of the sheet in a thickness direction is taken as 100% in observation of the surface of a region of 1 mm×1 mm, an area S occupied by the sheet in a section perpendicularly to the thickness direction at a position of 40% from the highest point of the sheet in the thickness direction is 65% or more.

5. The thermally conductive sheet according to claim 1, having a thermal resistance value of 0.024$°$ C.·in$^2$/W or less.

6. The thermally conductive sheet according to claim 1, having a thickness of 50 to 900 μm.

7. The thermally conductive sheet according to claim 1, wherein the proportion of the carbon fiber (B) having a fiber length of 200 μm or more is 3.2 to 11.4% of the carbon fiber X.

\* \* \* \* \*